United States Patent
Kim

(10) Patent No.: US 12,396,082 B2
(45) Date of Patent: Aug. 19, 2025

(54) MULTIMEDIA DEVICE AND DATA PROCESSING METHOD THEREFOR

(71) Applicant: LG ELECTRONICS INC., Seoul (KR)

(72) Inventor: Chihyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/387,397

(22) Filed: Nov. 6, 2023

(65) Prior Publication Data

US 2025/0048516 A1    Feb. 6, 2025

(30) Foreign Application Priority Data

Aug. 4, 2023   (KR) .................. 10-2023-0101900

(51) Int. Cl.
| | |
|---|---|
| *H05B 47/105* | (2020.01) |
| *H04N 5/262* | (2006.01) |
| *H04N 5/265* | (2006.01) |
| *H04N 21/41* | (2011.01) |
| *H04N 21/431* | (2011.01) |

(52) U.S. Cl.
CPC ......... *H05B 47/105* (2020.01); *H04N 5/2628* (2013.01); *H04N 5/265* (2013.01); *H04N 21/4104* (2013.01); *H04N 21/4316* (2013.01)

(58) Field of Classification Search
CPC .... H05B 47/105; H04N 5/2628; H04N 5/265; H04N 21/4104; H04N 21/4316
USPC ................. 348/460, 563, 564, 565
See application file for complete search history.

(56) References Cited

U.S. PATENT DOCUMENTS

| | | | |
|---|---|---|---|
| 2011/0221963 A1 | 9/2011 | Bruyneel et al. | |
| 2013/0271661 A1* | 10/2013 | Kimura | G09G 5/14 348/564 |
| 2017/0169794 A1* | 6/2017 | Nagano | G09G 5/02 |
| 2019/0354608 A1* | 11/2019 | dePaz | G06F 16/783 |

FOREIGN PATENT DOCUMENTS

| | | |
|---|---|---|
| JP | 2007220651 | 8/2007 |
| KR | 100683596 | 2/2007 |
| KR | 1020180071619 | 6/2018 |
| KR | 1020200095408 | 8/2020 |

OTHER PUBLICATIONS

European Patent Office Application Serial No. 23204579.9, Search Report dated Mar. 13, 2024, 7 pages.
Korean Intellectual Property Office Application No. 10-2023-0101900, Notice of Allowance dated Oct. 31, 2024, 6 pages.

* cited by examiner

*Primary Examiner* — Nathan J Flynn
*Assistant Examiner* — Omer Khalid
(74) *Attorney, Agent, or Firm* — LEE, HONG, DEGERMAN, KANG & WAIMEY

(57) ABSTRACT

Proposed is a multimedia device including an interface that receives first video data of a main app and second video data of a sub app, and a processor that processes video data for a smart lighting effect synchronized with the first video data and the second video data, wherein the processor mixes the first video data with the second video data and outputs the mixed video data, wherein the mixed video data is used as source data for operating smart lights.

15 Claims, 9 Drawing Sheets

MULTIMEDIA DEVICE AND DATA PROCESSING METHOD THEREFOR

Pursuant to 35 U.S.C. § 119, this application claims the benefit of earlier filing date and right of priority to Korean Application No. 10-2023-0101900, filed on Aug. 4, 2023, the contents of which are all incorporated by reference herein in its entirety.

BACKGROUND

Field

The present disclosure relates to a multimedia device and a data processing method therefor, and more particularly, to a multimedia device associated with smart lights and a video data processing method therefor.

Discussion of the Related Art

Because of a development of an LED lighting technology, smart lights synchronized with multimedia contents in a multimedia device such as a TV has been developed and marketed. The synchronization refers to outputting a lighting effect (e.g., color control, flickering, and the like) based on an image or a sound of the multimedia contents output via a display or a speaker.

In addition, recently, a picture in picture (PIP) function has been introduced again in the multimedia device such as the TV. For example, two apps may be executed, and thus, multimedia contents of the respective apps may be output in a main window (or a full window) and a sub window.

Therefore, there is a need for a plan for association with the smart lights when there are the multimedia contents output from the sub window as well as the main window.

SUMMARY

The present disclosure relates to a multimedia device for a smart lighting effect and a data processing method therefor.

Proposed is a multimedia device including an interface that receives first video data of a main app and second video data of a sub app, and a processor that processes video data for a smart lighting effect synchronized with the first video data and the second video data, wherein the processor mixes the first video data with the second video data and outputs the mixed video data, wherein the mixed video data is used as source data for operating smart lights.

Proposed is a multimedia device including an interface that receives first video data of a main app and second video data of a sub app, and a processor that processes video data for a smart lighting effect synchronized with the second video data, wherein the processor upscales the second video data and outputs the upscaled second video data, wherein the upscaled second video data is used as source data for operating smart lights.

Proposed is a method for processing video data of a multimedia device, the method including receiving first video data of a main app and second video data of a sub app, and processing the video data for a smart lighting effect synchronized with the first video data and the second video data, wherein the processing of the video data includes mixing the first video data with the second video data and outputting the mixed video data, wherein the mixed video data is used as source data for operating smart lights.

Proposed is a method for processing video data of a multimedia device, the method including receiving first video data of a main app and second video data of a sub app, and processing the video data for a smart lighting effect synchronized with the second video data, wherein the processing of the video data includes upscaling the second video data and outputting the upscaled second video data, wherein the upscaled second video data is used as source data for operating smart lights.

The above are only some of the embodiments of the present disclosure. Various embodiments in which the technical features of the present disclosure are reflected may be derived and understood based on the detailed descriptions of the present disclosure below by a person having ordinary knowledge in the art.

The present disclosure has following effects.

The present disclosure may output the smart lighting effect synchronized with the contents of the sub window when the multimedia contents are output from the sub window via the PIP function.

In addition, the present disclosure may maximize the smart lighting effect by outputting the dedicated multimedia contents for the smart lighting effect via the sub window.

In addition, the present disclosure may differentiate the lighting effects in the corresponding portion and the other portions of the smart lights by reflecting the relative location and the size of the sub window during the mixing or the scaling.

In addition, the present disclosure may obtain the expected smart lighting effect using the virtual video data regardless of the multimedia contents output on the display.

Effects obtainable from the present disclosure are not limited to the effects mentioned above, and other effects not mentioned will be clearly understood by those skilled in the art from the description below.

BRIEF DESCRIPTION OF THE DRAWINGS

The accompanying drawings, which are included as a portion of the detailed description to help understanding of the present disclosure, provide an embodiment of the present disclosure and illustrate the technical idea of the present disclosure together with the detailed description.

DESCRIPTION OF SPECIFIC EMBODIMENTS

Figure 1:
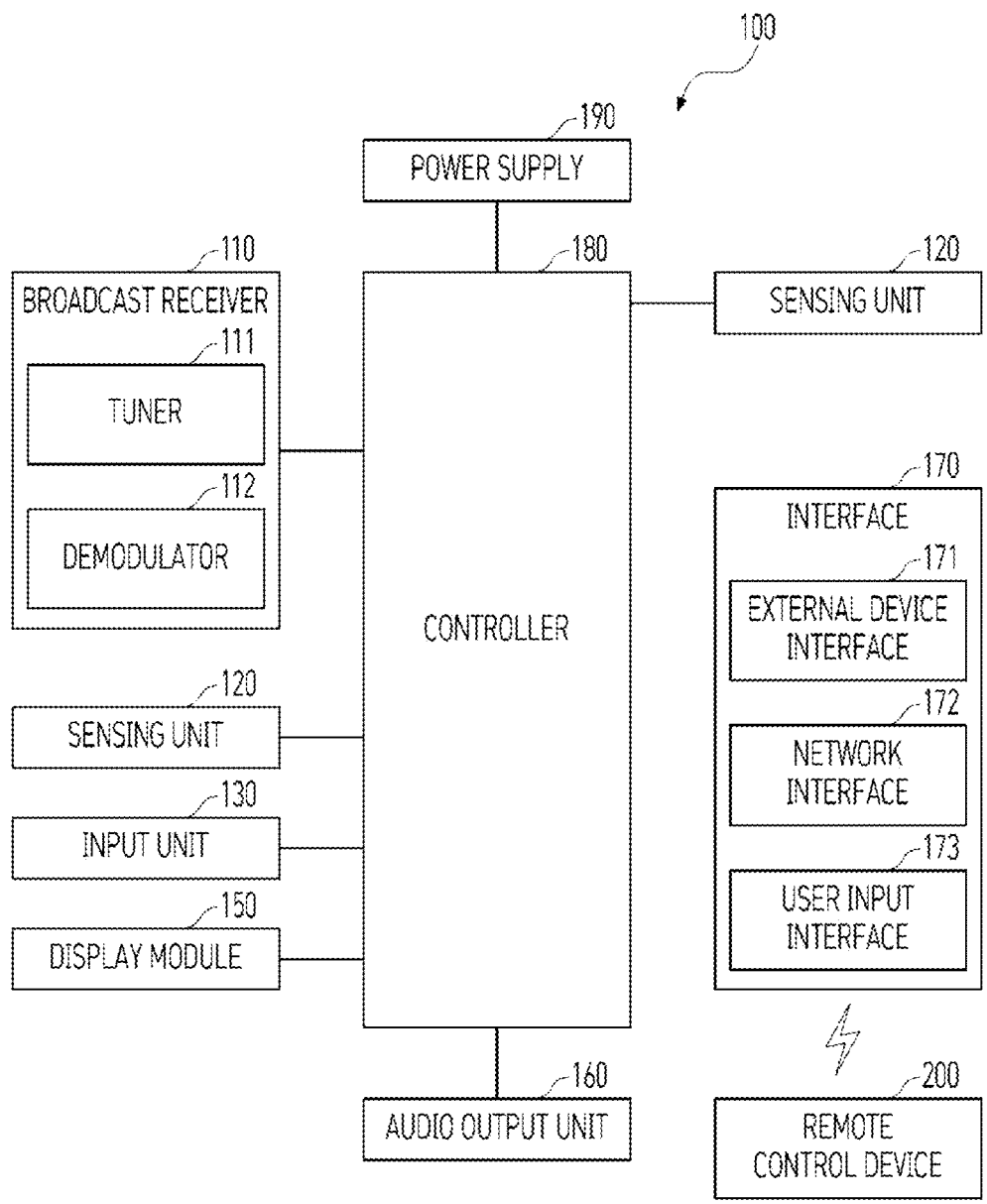
FIG. 1 is a block diagram for illustrating each component of a display device.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

In a following description, although being referred to as the display device 100, the display device may be referred to by various names such as a TV or a multimedia device, and the scope of the present disclosure may not be limited to the name.

FIG. 1 is a block diagram for illustrating each component of a display device 100 according to an embodiment of the present disclosure.

The display device 100 may include a broadcast receiver 110, an external device interface 171, a network interface 172, storage 140, a user input interface 173, an input unit 130, and a controller 180, a display module 150, an audio output unit 160, and/or a power supply 190.

The broadcast receiver 110 may include a tuner 111 and a demodulator 112.

Unlike the drawing, the display device 100 may include only the external device interface 171 and the network interface 172 among the broadcast receiver 110, the external device interface 171, and the network interface 172. That is, the display device 100 may not include the broadcast receiver 110.

The tuner 111 may select a broadcast signal corresponding to a channel selected by the user or all pre-stored channels among broadcast signals received via an antenna (not shown) or a cable (not shown). The tuner 111 may convert the selected broadcast signal into an intermediate-frequency signal or a base band image or audio signal.

For example, when the selected broadcast signal is a digital broadcast signal, the tuner 111 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 111 may process the digital broadcast signal or the analog broadcast signal. The analog base band image or audio signal (CVBS/SIF) output from the tuner 111 may be directly input to the controller 180.

In one example, the tuner 111 may sequentially select broadcast signals of all stored broadcast channels via a channel memory function among the received broadcast signals, and convert the selected signals into the intermediate-frequency signal or the base band image or audio signal.

In one example, the tuner 111 may include a plurality of tuners to receive broadcast signals of a plurality of channels. Alternatively, the tuner 111 may be a single tuner that simultaneously receives the broadcast signals of the plurality of channels.

The demodulator 112 may receive the digital IF signal (DIF) converted by the tuner 111 and perform a demodulation operation. The demodulator 112 may output a stream signal (TS) after performing demodulation and channel decoding. In this regard, the stream signal may be a signal in which an image signal, an audio signal, or a data signal is multiplexed.

The stream signal output from the demodulator 112 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180.

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180, and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 1 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module. The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R, G, and B. The plurality of pixels R, G, and B may be formed in respective areas where multiple data lines and multiple gate lines intersect each other.

The plurality of pixels R, G, and B may be disposed or arranged in a matrix form.

For example, the plurality of pixels R, G, and B may include a red (hereinafter, 'R') sub-pixel, a green ('G') sub-pixel, and a blue ('B') sub-pixel. The plurality of pixels R, G, and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor, and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image, and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source, and may include a power supply 190 that may be charged and used by including a battery.

In a case of the former, the power supply is used in connection with the cable, and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 1 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

Figure 2:
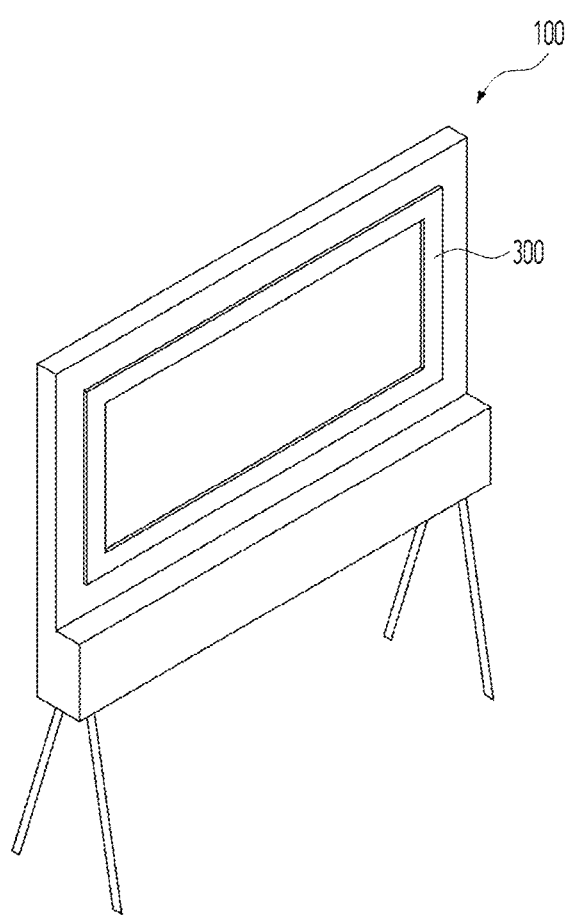
FIG. 2 is a diagram illustrating a display device having smart lights installed on a rear surface thereof according to an embodiment of the present disclosure.

FIG. 2 is a diagram illustrating the display device (hereinafter, referred to as "multimedia device") 100 having smart lights installed on a rear surface thereof according to an embodiment of the present disclosure. Hereinafter, redundant descriptions of the above descriptions will be omitted.

Referring to FIG. 2, smart lights 300 is installed on the rear surface of the multimedia device 100. The smart lights 300 may be LED lighting in a form of a strip, and may reproduce tens to millions of colors. In addition, the smart lights 300 is synchronized with an image or a sound of multimedia contents output from the multimedia device 100. For example, when an image having a yellow-based color such as a desert is output to a display 150 of the multimedia device 100, the smart lights 300 outputs the yellow-based color.

In addition, the smart lights 300 may output a different color for each area. When the display 150 is roughly divided into four areas, the smart lights 300 may also be divided into four areas. In this regard, when an image having a green-based color in a first area, a red-based color in a second area, a blue-based color in a third area, and a black-based color in a fourth area of the display 150 is output, the smart lights 300 corresponding thereto output the green, red, blue, and black-based colors respectively in a first area, a second area, a third area, and a fourth area. Even when the display 150 and the smart lights 300 are divided into more areas, synchronization of a color or the like of a partial area of the display and a partial area of the smart lights corresponding thereto is realized in the same manner.

In addition, in the above description, it has been described that the area of the display 150 and the area of the smart lights 300 are in one-to-one correspondence with each other, but a correspondence ratio may be set differently.

Figure 3:
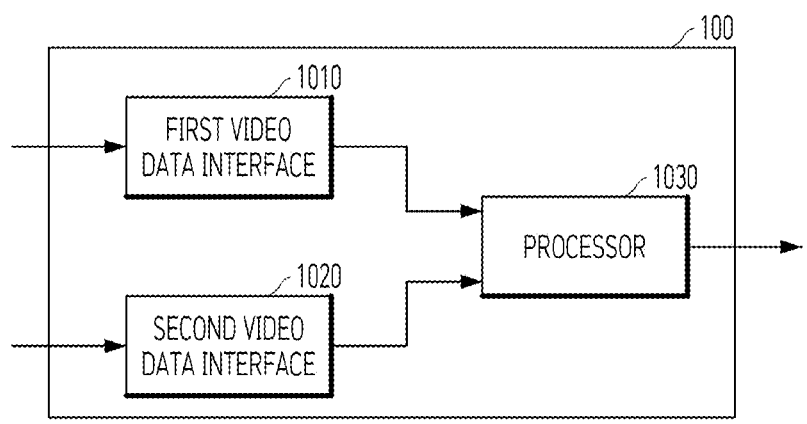
FIG. 3 shows a block diagram of a multimedia device for a smart lighting effect according to an embodiment of the present disclosure.

FIG. 3 shows a block diagram of a multimedia device for a smart lighting effect according to an embodiment of the present disclosure.

The multimedia device 100 includes a first video data interface 1010, a second video data interface 1020, and a processor 1030.

The first video data interface 1010 receives first video data. The first video data is video data reproduced or output from a main app of the multimedia device 100. An "app" is short for "application," and it refers to a type of computer program designed to perform specific functions or tasks. Apps are primarily associated with smartphones, tablets, computers, and other digital devices (that is, the multimedia device). The first video data is output via a main window on the display 150. The main window may have a size that covers an entirety of the display 150, but may not be limited thereto. The main window may be the same as a full window that covers the entirety of the display 150, but may not necessarily correspond to the full window. That is, the main window may be equal to or smaller than the full window. The first video data interface 1010 transfers the first video data to the processor 1030.

The second video data interface 1020 receives second video data. The second video data is video data reproduced or output from a sub app of the multimedia device 100. The second video data is output via a sub window on the display 150. The sub window may have a size that covers portion of the display 150, but may not be limited thereto. The second video data interface 1020 transfers the second video data to the processor 1030.

The processor 1030 mixes the first video data and the second video data with each other. The mixing means converting the two video data into one video data. The processor 1030 outputs the mixed video data. The mixed video data may be transferred to an app for operating the smart lights. The mixed video data is used as source data for operating the smart lights.

When the second video data is used as the source data for operating the smart lights as such, more diverse lighting effects may be implemented than in a conventional scheme in which the smart lights was operated only using the first video data. For example, when the first video data is rather less dynamic and static content, when the user wants a flashy smart lighting effect, the smart lights may be changed by reproducing the second video data, which is dynamic content, via the sub app.

Figure 4:
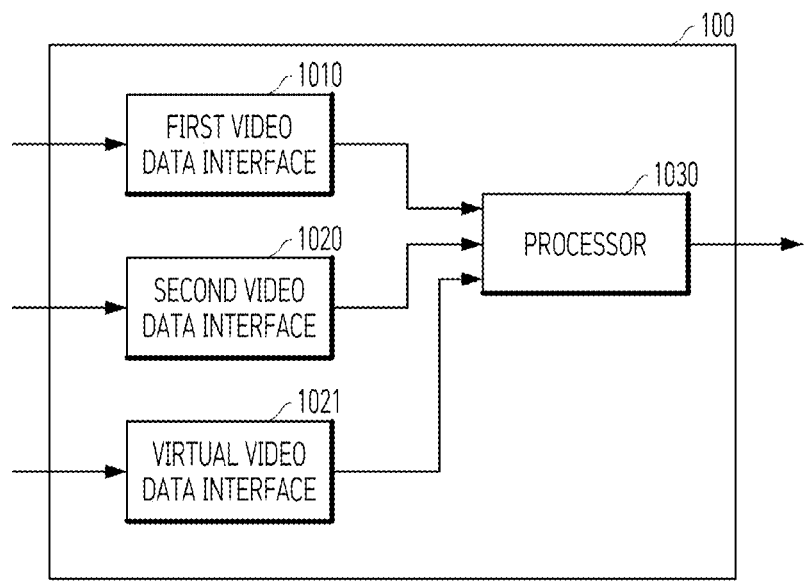
FIG. 4 shows a block diagram of a multimedia device for a smart lighting effect according to an embodiment of the present disclosure.

FIG. 4 shows a block diagram of a multimedia device for a smart lighting effect according to an embodiment of the present disclosure. Compared to FIG. 3, the multimedia device in FIG. 4 further includes a virtual video data interface 1021. Hereinafter, redundant descriptions of the above descriptions will be omitted.

The virtual video data interface 1021 receives virtual video data. The virtual video data is not data reproduced or output from the multimedia device 100. The virtual video data is used as the source data for operating the smart lights. The virtual video data may be set to produce a smart lighting effect in a preset pattern.

The processor 1030 mixes the first video data, the second video data, and the virtual video data with each other. The mixing means converting the three video data into one video data. The processor 1030 outputs the mixed video data. The mixed video data may be transferred to the app for operating the smart lights. The mixed video data is used as the source data for operating the smart lights.

In addition, the processor 1030 may receive the video data from the first video data interface 1010 and the second video data interface 1020, but may exclude one or more of the first video data and the second video data from the mixing. That is, the processor 1030 may output only the virtual video data, and the virtual video data may be transferred to the app for operating the smart lights. In addition, the processor 1030 may mix the virtual video data with one of the first video data and the second video data, and output the mixed data.

Utilization of the virtual video data may allow the smart lights to be operated in more diverse schemes. Because the virtual video data is data that is not output or reproduced on the display of the multimedia device 100, the lighting effect desired by the user may be realized without any other change to the display. That is, the virtual video data may be provided as dedicated data for the smart lights.

For example, the virtual video data may operate the smart lights 300 such that light of specific colors are sequentially emitted in a clockwise direction. As another example, the virtual video data may operate the smart lights 300 such that light of colors of a predefined group are sequentially emitted while creating a gradient (i.e., an intensity of light gradually increases and then decreases after a peak) effect.

In addition, the virtual video data corresponds to information related to the first video data or the second video data. To this end, a plurality of virtual video data may be prepared, and one of those may be selected based on the first video data or the second video data. As a preferred example, information related to video data may be genre information of the corresponding video data. In this case, when the video data is movie content and the corresponding movie is a horror movie, virtual video data related to the horror movie is selected. For example, the virtual video data at this time may be data that causes the mixed video data to have a darker color or lower brightness or chroma than the first video data and/or the second video data.

Figure 5:
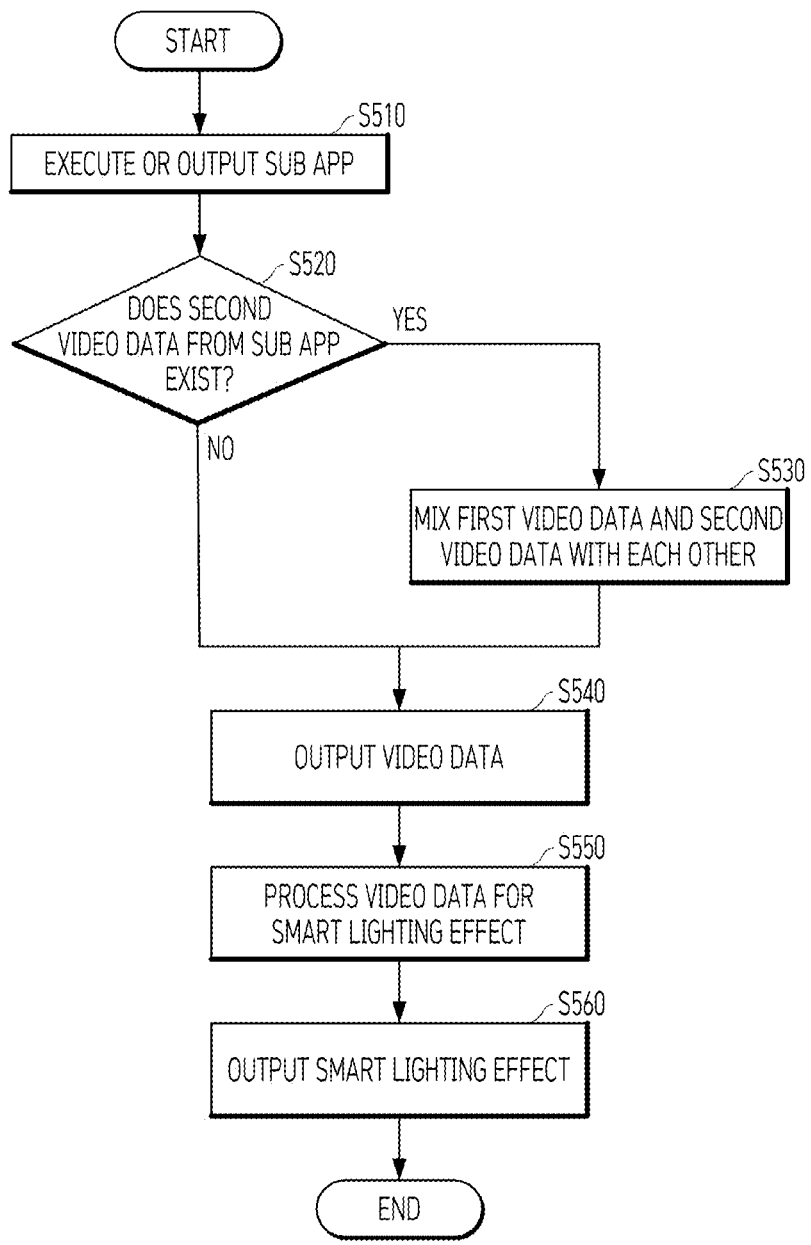
FIG. 5 shows a flowchart of procedures related to a smart lighting effect according to an embodiment of the present disclosure.

FIG. 5 shows a flowchart of procedures related to a smart lighting effect according to an embodiment of the present disclosure.

FIG. 5 is realized in a situation in which the first video data is being output on the display 150 via the main app.

The processor 1030 may execute or output the sub app (S510). In this regard, the sub app may be an app output in a partial area of the display 150 or an app for using the virtual video data described in relation to FIG. 4.

To this end, the sub app may manage the multimedia contents to be output on the display 150 in a form of a list and may store the multimedia contents in a memory 140. In addition, the sub app may manage the virtual video data in a form of a list and store the virtual video data in the memory 140.

The processor 1030 may identify whether the second video data from the sub app exists (S520). In this regard, the second video data includes the virtual video data. When the second video data does not exist, the processor 1030 may output only the first video data (S540). When the second video data exists, the processor 1030 may mix the first video data and the second video data with each other (S530). Then, the processor 1030 may output the mixed video data (S540).

In one example, in the mixing (S530), a scaling operation may be performed when sizes or resolutions of the two video data are different from each other. The processor 1030 compares the sizes or the resolutions of the two video data with each other and, when the sizes or the resolutions are the same, mixes the two data with each other without the scaling.

When the sizes or the resolutions of the two data are different from each other, the processor 1030 scales one of the two data to the size or the resolution of the other. The processor 1030 scales the second video data to the size of the first video data, and mixes the first video data with the scaled second video data. Alternatively, the processor 1030 scales the first video data to the size of the second video data, and mixes the second video data with the scaled first video data.

Whether to scale the first video data or the second video data may be determined based on a resolution (e.g., the number of expressible colors or the number of LEDs) of the smart lights or a performance of the processor 1030. As the resolution of the smart lights or the performance of the processor 1030 is lower, the processor 1030 may scale one video data to a size of the other with a smaller size among the first video data and the second video data.

In addition, the mixed video data is processed to contain a relative location or size of the sub window for the second video data on the full window (or the display). That is, an influence of the second video data on the mixed video data is limited to a location and a size of the sub window. For example, when the sub window is set to occupy a horizontal 10% and vertical 10% area from an upper right corner of the display, the mixed video data is set to reflect (or mix) the second video data only for a partial area of the smart lights corresponding to the corresponding area.

To this end, the video data must be able to be defined to contain information such as a location to be output and displayed on the display 150 or the main/sub window on the display and a size. For example, when the display 150 has a resolution of 1920*1080 (FHD), the first video data will be output in a full screen (the main window) and thus will have a size limited to a FHD size, and the second video data will be output in the sub window and thus will have a smaller size (e.g., a resolution of 600*400) than the FHD. When the mixed video data is defined to have a value for 1920*1080 (FHD) pixels, the second video data should only be reflected in a value for 600*400 pixels corresponding to the location of the sub window.

The app or a device for operating the smart lights (hereinafter, referred to as a "smart lights operator") may process the video data received from the processor 1030 to operate the smart lights (S550). The smart lights operator may operate the smart lights using the processed data, and accordingly, the smart lights may output light (S560).

Figure 6:
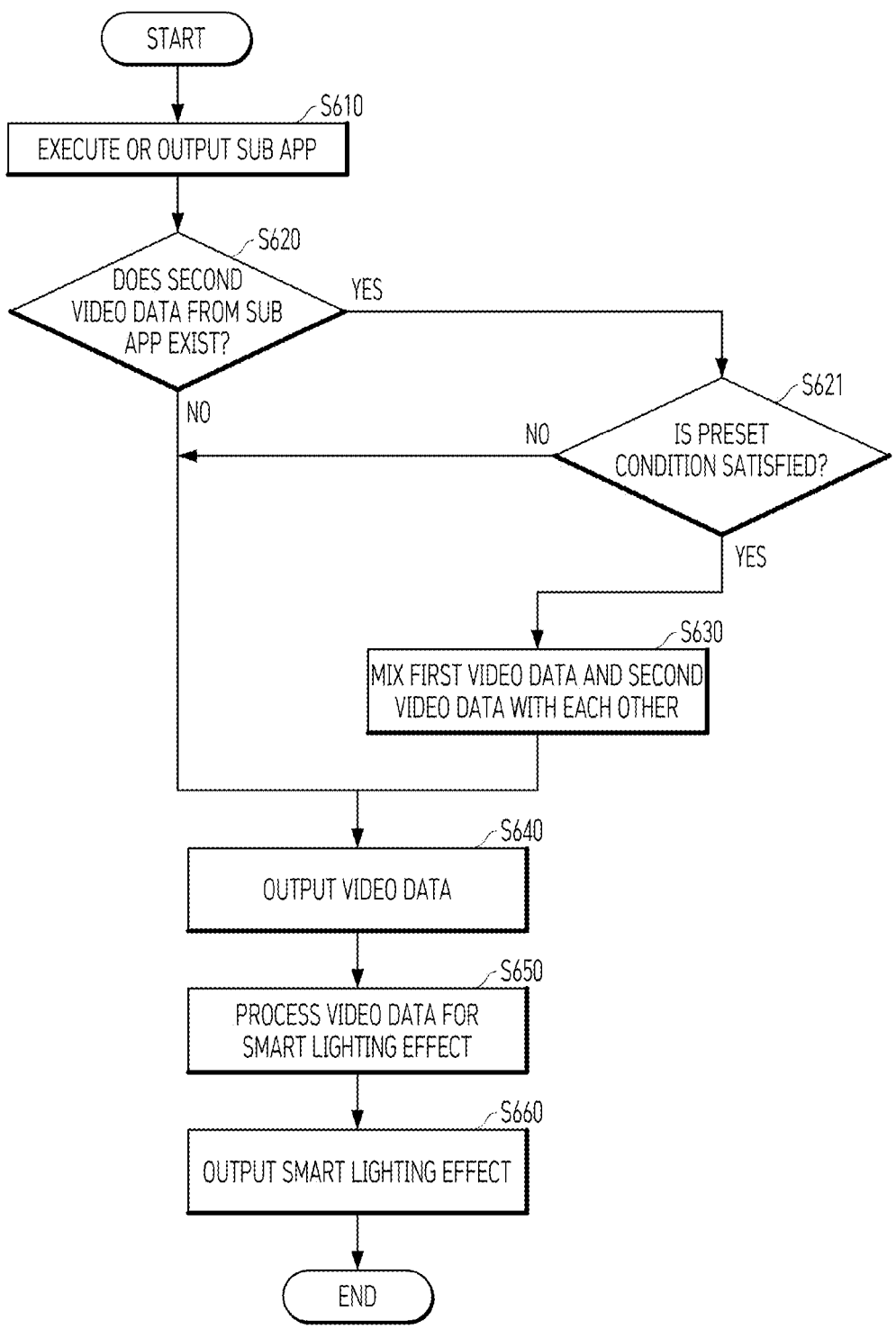
FIG. 6 shows a flowchart of procedures related to a smart lighting effect according to an embodiment of the present disclosure.

FIG. 6 shows a flowchart of procedures related to a smart lighting effect according to an embodiment of the present disclosure. Hereinafter, redundant descriptions of the above descriptions will be omitted.

S610, S620, S630, S640, S650, and S660 in FIG. 6 are the same as S510, S520, S530, S540, S550, and S560 in FIG. 5.

Unlike FIG. 5, FIG. 6 is an embodiment in which a condition for mixing the video data is added. Accordingly, the processor 1030 may determine whether the preset condition for the mixing is satisfied (S621). When the preset condition is not satisfied, the processor 1030 outputs the first video data (S640).

When the preset condition is satisfied, the processor 1030 mixes the first video data and the second video data with each other (S630).

In a preferred embodiment, the preset condition is a case in which a prespecified object is detected in the first video data. That is, when the prespecified object is detected in the first video data, the processor 1030 mixes the first video data with the second video data (S630). This may expect an effect of emphasizing the corresponding object via the smart lights when the specific object appears.

As another preferred embodiment, the preset condition is a case in which a speed of change of the first video data is smaller than a preset reference value. That is, as the first video data is closer to a still image, the processor 1030 mixes the first video data with the second video data (S630). This may expect a more dynamic light color change or effect when the light or the effect of the smart lights is static.

Figure 7:
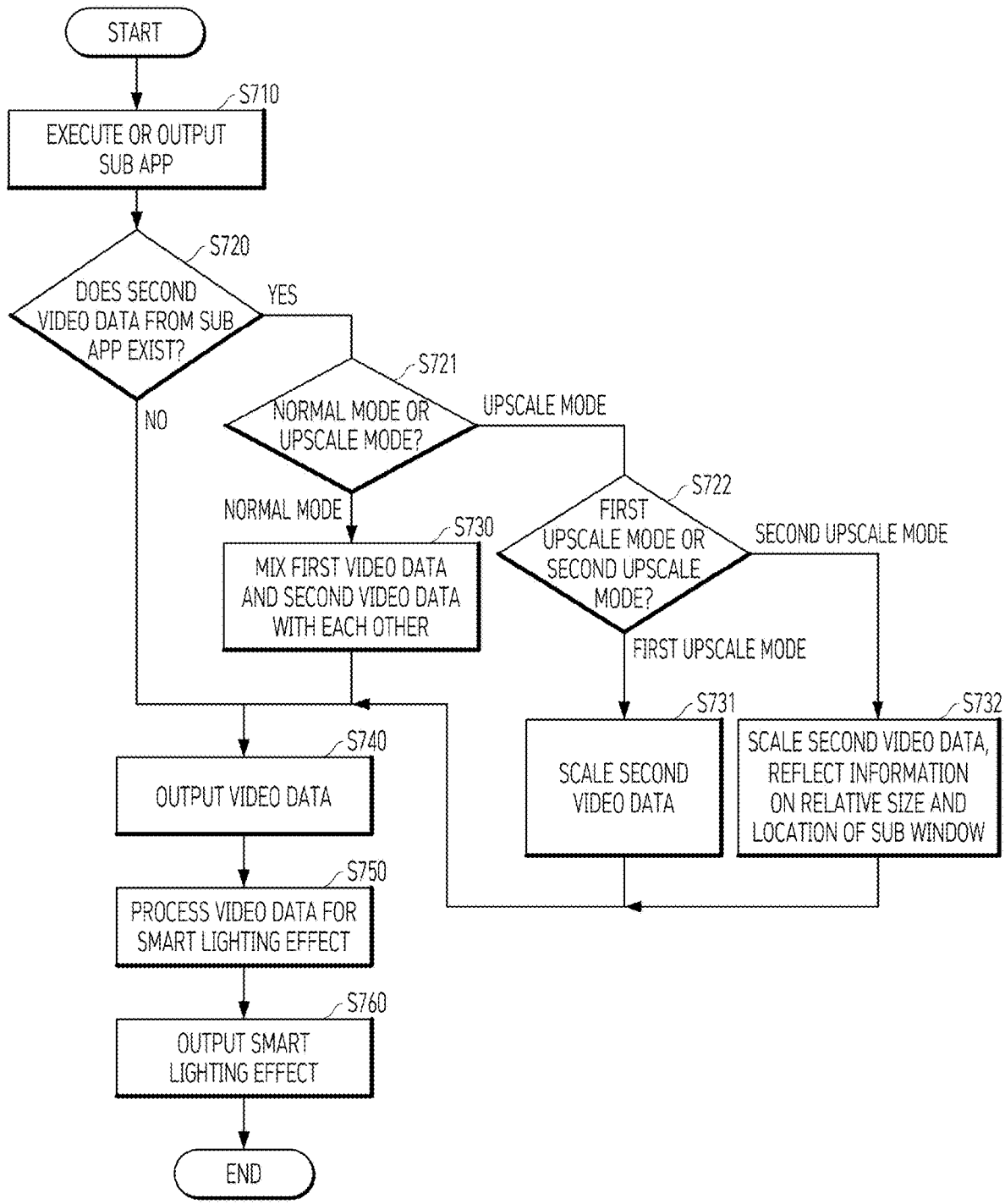
FIG. 7 shows a flowchart of procedures related to a smart lighting effect according to an embodiment of the present disclosure.

FIG. 7 shows a flowchart of procedures related to a smart lighting effect according to an embodiment of the present disclosure. Hereinafter, redundant descriptions of the above descriptions will be omitted.

S710, S720, S730, S740, S750, and S760 in FIG. 7 are the same as S510, S520, S530, S540, S550, and S560 in FIG. 5.

FIG. 7 is an embodiment in which a mode setting for the smart lighting effect is added. Unlike FIG. 5, the processor 1030 mixes or scales the video data based on the set mode.

The processor 1030 may identify whether it is a normal mode or an upscale mode (S721). In the case of the normal mode, the processor 1030 may mix the first video data with the second video data (S730).

In the case of the upscale mode, the processor 1030 may determine whether it is a first upscale mode or a second upscale mode (S722). The upscale mode processes only the second video data without mixing the first video data with the second video data. That is, the upscale mode is a mode in which the second video data is used as the dedicated data for the smart lighting effect.

The "upscale" is an expression used to serve as video data corresponding to the full window because the size of the sub window where the second video data is output is smaller than the size of the full window (a size of the display). That is, when the first video data and the second video data are mixed with each other as shown in the flowchart in FIG. 5, a portion where the second video data generally affects the operation of the smart lights is a partial area of the smart lights corresponding to the sub window where the second video data is output. In the "upscale" mode, the second video data is used as operating data for an entire area of the smart lights regardless of the size of the sub window.

However, when the second video data contains information on a size of the sub window and a relative location of the sub window with respect to the full window, the second video data is output on the sub window, the second video data may actually be upscaled to the size of the full window.

In the case of the second upscale mode, the processor 1030 may upscale the second video data, but may reflect the information on relative size and location of the sub window where the second video data is output (S732). The upscaling operation is the same as that in the first upscaling mode (S731), but, in the second upscale mode, the information on the relative size and location of the sub window is contained in the upscaled second video data.

For example, assuming that the display is divided into four quadrants and the sub window is located in an upper right quadrant, the upscaled second video data may contain information for reflecting additional effects related to a color, a brightness, a chroma, and the like in a partial area of the smart lights 300 corresponding to the upper right quadrant.

That is, the upscaled second video data may contain information for setting the brightness or the chroma of the partial area of the smart lights 300, which corresponds to the information on the relative location and the size of the sub window where the second video data is output, higher than that of other partial areas.

Figure 8:
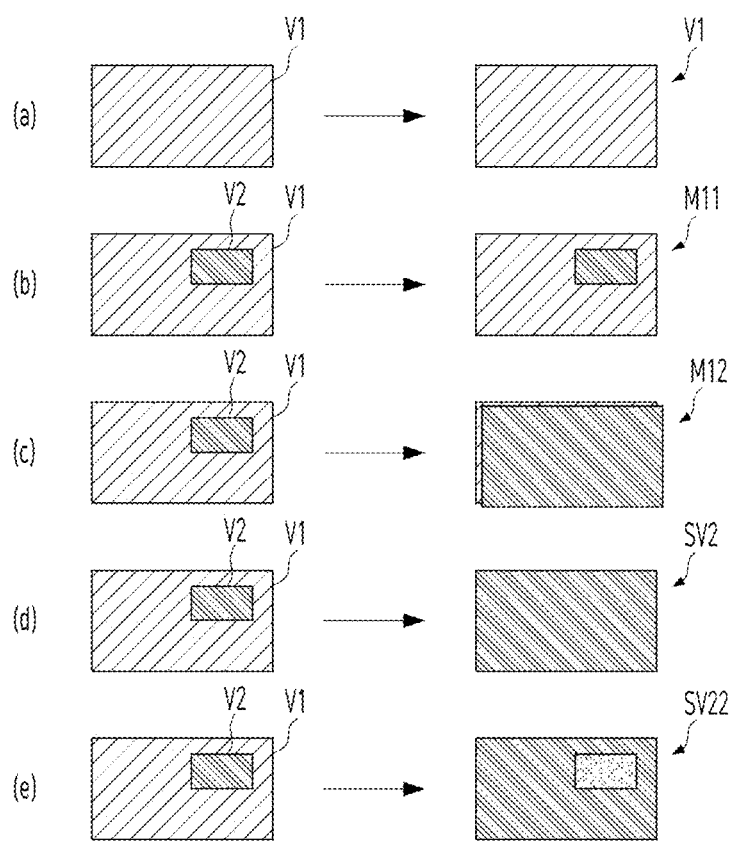
FIG. 8 illustrates mixing or scaling of first video data and second video data related to a smart lighting effect according to an embodiment of the present disclosure.

FIG. 8 conceptually illustrates results of mixing or scaling first video data and second video data related to a smart lighting effect according to an embodiment of the present disclosure. In each of (a) to (e), a left side represents the first video data (the main window, that is, the full window) and the second video data (the sub window), and a right side represents a mixed or scaled result.

(a) shows a case in which only first video data V1 is output by the processor 1030.

(b) shows cases (S530, S630, and S730) in which the first video data V1 and second video data V2 are mixed with each other by the processor 1030.

(c) shows a case in which the first video data V1 and the upscaled second video data V2 are mixed with each other by the processor 1030. Although not described above, when the first video data and the second video data are mixed with each other, the second video data may be upscaled and then mixed with the first video data.

(d) shows a case (S731) in which the second video data is upscaled by the processor 1030.

(e) shows a case (S732) in which the second video data is upscaled by the processor 1030, but a relative location and a size thereof are reflected.

Figure 9:
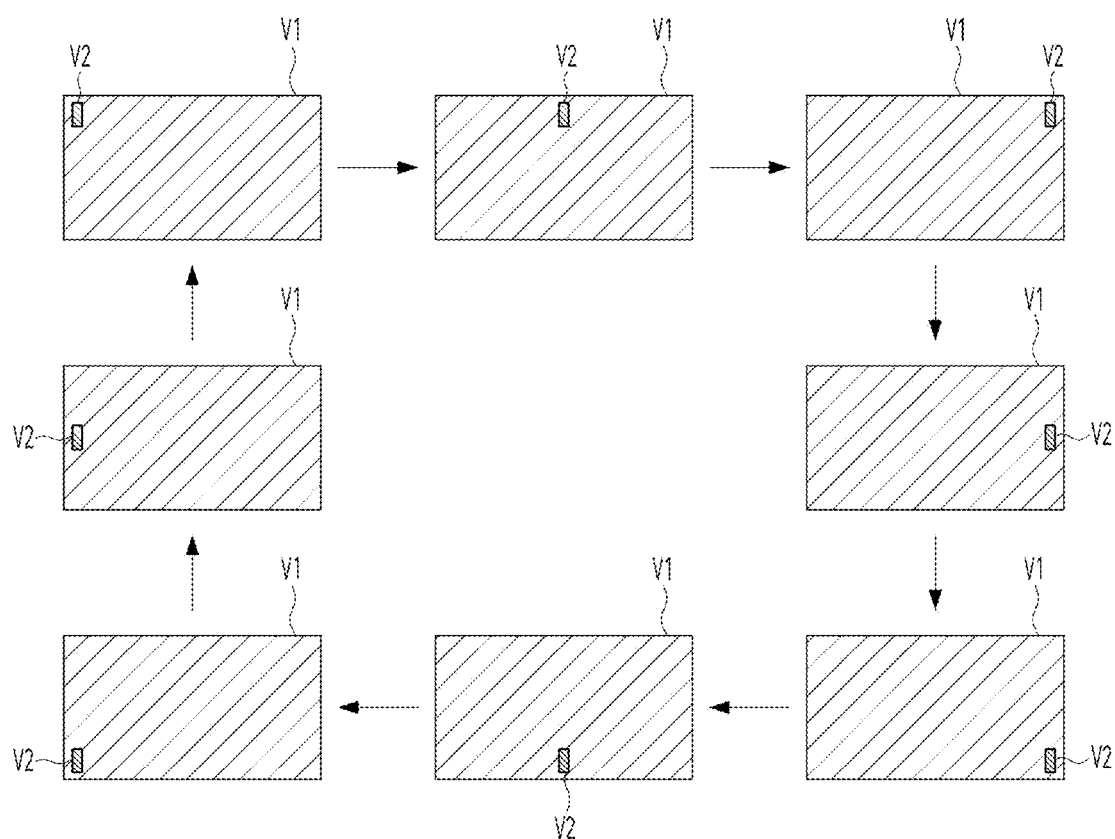
FIG. 9 illustrates mixing of first video data and second video data related to a smart lighting effect according to an embodiment of the present disclosure.

FIG. 9 illustrates mixing of first video data and second video data related to a smart lighting effect according to an embodiment of the present disclosure. In this regard, the second video data V2 may be the virtual video data.

The second video data V2 may be, for example, a still image corresponding to one frame. When the processor 1030 mixes the second video data V2 with the first video data, the mixing may be performed while changing the relative location of the second video data like sequentially rotating the second video data in the clockwise direction as shown. The mixing of the second video data V2 like the sequential rotating of the second video data in the clockwise direction is merely one example, and a shape, a pattern, a sequential movement, or the like of the second video data may be set in various ways for various smart lighting effects.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the scope of the disclosure. Therefore, the present disclosure is not limited to the embodiments disclosed herein but intends to give the broadest scope consistent with the new principles and features disclosed herein.

What is claimed is:

1. A multimedia device comprising:
   an interface configured to receive first video data of a main app and second video data of a sub app,
   wherein the first video data is displayed on a main window or a full window of a display of the multimedia device and the second video data is displayed on a sub window of the display, and the sub window is included in the main window or the full window, and
   a processor configured to process the first video data and the second video data to obtain a source data for operating smart lights and output the source data to a smart lights operating app,
   wherein the source data causes the smart lights to output colors synchronized with colors, which the first video data and second video data output on the display.

2. The multimedia device of claim 1,
   wherein the source data comprises information on a relative location and a size of the sub window with respect to the main window or the full window,
   wherein the second video data is output in the sub window, and
   wherein a lighting effect caused by the second video data is output in a partial area of the smart lights corresponding to the information on the relative location and the size of the sub window.

3. The multimedia device of claim 1,
   wherein the processor is configured to further process a virtual video data with the first video data and the second video data to obtain the source data, and
   wherein the virtual video data is used for obtaining the source data and is not displayed in the display.

4. The multimedia device of claim 3, wherein the virtual video data is associated with information related to the first video data or the second video data.

5. The multimedia device of claim 4, wherein the information related to the first video data or the second video data includes genre information related to the first video data or the second video data.

6. The multimedia device of claim 1, wherein the processor is configured to detect a predetermined object in the first video data, and process the first video data and the second video data to obtain the source data in response to that the predetermined object is detected.

7. The multimedia device of claim 1,
   wherein the first video data comprises information on a size of the main window and a relative location of the main window with respect to the full window, and
   wherein the second video data comprises information on a size of the sub window and a relative location of the sub window with respect to the full window.

8. The multimedia device of claim 1, wherein the processor is configured to scale the second video data to a size of the first video data, and process the scaled second video data with the first video data to obtain the source data.

9. The multimedia device of claim 1, wherein the processor is configured to scale the first video data to a size of the second video data, and process the scaled first video data with the second video data to obtain the source data.

10. The multimedia device of claim 1, further comprising:
    the display configured to output the first video data or the second video data.

11. The multimedia device of claim 10, further comprising:
    the smart lights attached to a rear surface or a side surface of the display, wherein the smart lights is configured to emit light based on the source data.

12. A multimedia device comprising:
    an interface configured to receive first video data of a main app and second video data of a sub app,
    wherein the first video data is displayed on a main window or a full window of a display of the multimedia device and the second video data is displayed on a sub window of the display, and the sub window is included in the main window or the full window, and
    a processor configured to process the second video data to be scaled up from a size corresponding to the sub window to a size corresponding to the full window to obtain a source data for operating smart lights and output the source data to a smart lights operating app,
    wherein the source data causes the smart lights to output colors synchronized with colors, which the second video data outputs on the display.

13. The multimedia device of claim 12, wherein the second video data comprises information for setting brightness or chroma of a partial area of the smart lights corresponding to information on a relative location and a size of the sub window to be higher than brightness or chroma of partial areas of the smart lights.

14. A method for processing video data of a multimedia device, the method comprising:
    receiving first video data of a main app and second video data of a sub app, wherein the first video data is displayed on a main window or a full window of a display of the multimedia device and the second video data is displayed on a sub window of the display, and the sub window is included in the main window or the full window;
    processing the first video data and the second video data to obtain a source data for operating smart lights; and
    outputting the source data to a smart lights operating app,
    wherein the source data causes the smart lights to output colors synchronized with colors, which the first and second video data output on the display.

15. A method for processing video data of a multimedia device, the method comprising:
    receiving first video data of a main app and second video data of a sub app, wherein the first video data is displayed on a main window or a full window of a display of the multimedia device and the second video data is displayed on a sub window of the display, and the sub window is included in the main window or the full window; and processing the second video data to be scaled up from a size corresponding to the sub window to a size corresponding to the full window to obtain a source data for operating smart lights; and outputting the source data to a smart lights operating app, wherein the source data causes the smart lights to output colors synchronized with colors, which the second video data outputs on the display.

* * * * *